(12) United States Patent
Van Den Bergh et al.

(10) Patent No.: US 10,274,339 B2
(45) Date of Patent: Apr. 30, 2019

(54) SYSTEM FOR CALCULATING AIRCRAFT PERFORMANCE AND METHOD FOR PERFORMING THE SAME

(71) Applicant: AVIOVISION, Genk (BE)

(72) Inventors: Kris Van Den Bergh, Genk (BE); Wim Cyriel Maria De Munck, Genk (BE); Tom Hugo Jan Luc De Winne, Genk (BE); Koen Verhavert, Genk (BE)

(73) Assignee: AVIOVISION, Hasselt (BE)

( * ) Notice: Subject to any disclaimer, the term of this patent is extended or adjusted under 35 U.S.C. 154(b) by 114 days.

(21) Appl. No.: 15/511,105

(22) PCT Filed: Sep. 16, 2015

(86) PCT No.: PCT/EP2015/071247
§ 371 (c)(1),
(2) Date: Mar. 14, 2017

(87) PCT Pub. No.: WO2016/042036
PCT Pub. Date: Mar. 24, 2016

(65) Prior Publication Data
US 2017/0241798 A1    Aug. 24, 2017

(30) Foreign Application Priority Data
Sep. 16, 2014    (EP) .................................. 14185012

(51) Int. Cl.
*G01C 23/00* (2006.01)
*B64F 5/60* (2017.01)

(52) U.S. Cl.
CPC ............... *G01C 23/00* (2013.01); *B64F 5/60* (2017.01)

(58) Field of Classification Search
CPC .......... G01P 13/025; G01P 5/165; G01P 5/14; G01P 5/16; G01P 13/02; G01P 5/00;
(Continued)

(56) References Cited

U.S. PATENT DOCUMENTS 6,038,932 A * 3/2000 Wandel ................ G01P 5/165
73/182
9,470,549 B2 * 10/2016 Geay .................... G08G 5/0021
(Continued)

OTHER PUBLICATIONS

Metin Zontul et al., "Rule based aircraft performance system", International Journal of Soft Computing and Engineering (IJSCE), pp. 61-66 (Sep. 2013).

*Primary Examiner* — Andre J Allen
(74) *Attorney, Agent, or Firm* — Browdy and Neimark, P.L.L.C.

(57) ABSTRACT

A system for determining aircraft performance for at least one flight phase includes a first terminal (11) comprising connections to a first, second and third repository respectively comprising at least a first set of data files (22) a second set of executable scripts (23) and a third set of configuration files (17). At least the third set of configuration files is arranged to be accessed via a second user interface of a second terminal (18). The system further comprises a calling module (12) arranged for selecting, based on the input parameters received and the configuration file selected, at least one executable script file (23) for processing the associated data files (22) so as to determine by a calculation engine (26) the performance of the aircraft for the least one flight phase.

15 Claims, 9 Drawing Sheets

(58) Field of Classification Search
CPC .. G01P 5/02; G01P 21/025; G01P 5/12; G01P 5/26; G01P 5/005; G01P 5/175; G01P 5/18; G01P 5/24; G01P 13/045; G01P 15/036; G01P 1/02; G01P 21/00; G01P 3/62; G01P 5/07; G01P 5/08; G01P 5/245
USPC ..................................................... 73/170.02
See application file for complete search history.

(56) References Cited

U.S. PATENT DOCUMENTS

| | | | |
|---|---|---|---|
| 2002/0128806 A1* | 9/2002 | Anderson | F41G 7/006 |
| | | | 703/2 |
| 2007/0010985 A1* | 1/2007 | Anderson | F41G 7/006 |
| | | | 703/22 |
| 2007/7219676 | 9/2007 | Allen et al. | |
| 2013/0204544 A1* | 8/2013 | Thomas | G01P 5/06 |
| | | | 702/41 |
| 2013/0325218 A1* | 12/2013 | Spoldi | B64C 13/503 |
| | | | 701/14 |
| 2014/0180507 A1 | 6/2014 | Geay et al. | |
| 2014/0230539 A1* | 8/2014 | Perju | G01P 13/025 |
| | | | 73/180 |
| 2016/0305977 A1* | 10/2016 | Genevrier | G01P 13/025 |
| 2016/0376003 A1* | 12/2016 | Feldman | B64C 39/005 |
| | | | 703/2 |
| 2017/0299626 A1* | 10/2017 | Dichek | G01P 21/025 |

* cited by examiner

| TAKEOFF | LANDING | CRUISE |

ALL WEIGHT
IN KG

CLEAR
T/O PERFO

ICAO  BGGH           RUNWAY  RWY 35       INT  D9           CHANGE ➡

CONDITIONS

METAR                                                        UPDATE
                                                             METAR
04014KT 9999 BKN093 M02/M05 Q0998

WIND  070  /  12   TEMP  16   QNH  1012

RUNWAY                                                       MORE ➡

⦿ DRY     ◯ WET

RESULTS

FULL THRUST        LIMIT  -      MTOWP -
    V1  -          VR  -         V2  -                       CALCULATE
    FRS -          VFTO -        TORQUE -
MINTAT -

REDUCED THRUST     LIMIT  -      ATOW  -    TFLEX  -
    V1  -          VR  -         V2  -
    FRS -          VFTO -        TORQUE -
MINTAT -

ACCELERATION ALTITUDE  -
ENGINE OUT PROCEDURE  -
              NOTES  -

Figure 4 (b)

| TAKEOFF | LANDING | CRUISE |

| CONFIRM | CANCEL |

RUNWAY DETAILS

AIRPORT BGGH    AIRPORT ELEVATION    6000                    [OBSTACLES]

RUNWAY [RWY07R]   INT [A2]      EANG [0][90][180]   QFU [056]
TORA   [1900]     TODA [1900]   ASDA [1900]         SLOPE [-0.6]
LDA    [1800]     GA [2.1]      EFP [          ]

RWY 35

○ D9

RWY 07R

● A2              ○ K1

RWY 19

SYSTEM FOR CALCULATING AIRCRAFT PERFORMANCE AND METHOD FOR PERFORMING THE SAME

TECHNICAL FIELD

The present invention relates to a system and a method for determining aircraft performance for at least one flight phase.

BACKGROUND ART

In the aviation industry, the term aircraft performance mainly refers to the ability of the aircraft to operate safely under specific environmental and load conditions during the flight phases of take-off, landing and cruise. The aircraft performance mainly involves the calculation of a set of speeds and a corresponding power or thrust setting that will guarantee the safe operation of the aircraft during the different flight phases based on a set of input parameters such as the environmental conditions, the aircraft load and others. For example, for the take-off flight phase the aircraft performance may include among others the speed V1 of the aircraft at the point of decision during the take-off roll, the speed VR indicating the rotation speed of the aircraft on the runway, and the speed V2 indicating the speed of the aircraft after take-off. To enhance the accuracy of the aircraft performance and therefore the safety, the calculation may be supplemented with additional input parameters related to the aircraft configuration such as the flap and thrust or power settings. Therefore, the aircraft performance needs to be calculated not only with regards to the exact aircraft type but also taking into account the aircraft unique configuration settings in order to ensure the safe operation of the aircraft during the different flight phases. The aircraft performance calculations may be performed by the pilots or other highly trained personnel using a set of documents known as the pilot's flight bag. The pilot's flight bag includes, among other documents, the Aircraft Flight Manual (AFM) provided by the aircraft manufacturer, which details the recommended aircraft operating procedures for executing normal, abnormal and emergency operations during the different flight phases, together with the aircraft performance that should be achieved when the aircraft is operated in accordance with these procedures. In essence, the AFM provides a step-by-step guide with information indicating the parameters required to perform a given aircraft performance calculation, the associated documents, in either paper or digital format, containing the required parameters, and the calculation steps involved. To reduce the amount of paperwork carried in the aircraft cockpit the traditional pilot's flight bag is slowly being replaced with a digital version, known as the Electronic Flight Bag (EFB), which may be in the form of an electronic information management device to help flight crews perform flight management tasks more easily and efficiently, and with less paper.

The pilot calculates the aircraft performance based on the aircraft configuration and appropriate input parameters specified in the AFM so as to generate an aircraft performance profile indicating the set of speeds and the corresponding power or thrust setting for safely operating the aircraft for a given flight stage. The calculation may be performed manually or be automated, for example using the aircraft's flight management system (FMS) or a portable electronic device. For example, a SCAP module may be used for performing the aircraft performance calculation automatically. The SCAP (Standard Computerized Airplane Performance) is an IATA standardized method by which the aircraft manufacturers present their aircraft performance. The SCAP module takes two pre-defined vectors as inputs and returns two pre-defined vectors as output. In each case, one vector is alphanumeric and one is numeric. The SCAP module is generally written in a programming language known as FORTRAN. When called with a set of input parameters, the SCAP module returns either an error flag 'A' along with the resulting performance data or an error flag that is NOT 'A'. In the case of a NOT 'A' return, the error flag can be either 'B' (Input error), 'C' (Computational error) or 'E' (Performance restrictions).

However, the above methods for calculating the aircraft performance either manually, using the AFM documents, or automatically, using the SCAP module, are greatly prone to human errors. For example, the pilot may enter in the SCAP module the wrong data for certain parameters, e.g. pressure, temperature or weight, thereby leading to an incorrect calculation of the aircraft performance. In another example, where the aircraft performance is calculated using the paper AFM procedure, the pilot may use the wrong performance charts for the aircraft type, select the wrong table or column/row in the performance charts, use incorrect values when referencing the performance charts, or fail to convert values into the required unit of measurement. Moreover, when considering that different airlines use, and different aircraft types require, different methods for calculating and entering aircraft performance parameters, it becomes very difficult to ensure that such errors are prevented or captured.

Furthermore, different airlines have different requirements for operating their aircrafts and may require that aircraft performance is calculated under different usage scenarios. For example, an airline may require that the aircraft performance is always optimised towards fuel efficiency irrespective of the weather conditions so as to reduce the operating cost of the aircraft. Such an optimisation may require the generation of a large number of aircraft performance profiles in a short amount of time, which may be performed by varying certain input parameters, so as to identify the aircraft performance that meets the optimisation goal set by the airline. Currently the performance calculating methods mentioned above are not suitable to handle the generation of multiple performance profiles in a short amount of time, since they require the user to input manually the input parameters and their subsequent variations for generating the different usage scenarios. Moreover, the SCAP module does not have the flexibility to accommodate the generation of different usage scenarios according to the airlines' requirements. This is because the SCAP module is a standalone module that is manufactured and provided by the original equipment manufacturer, meaning that its software code, after installation, is not accessible to the airline for modification. As a result, the airline has no control over the way the aircraft performance is calculated and the input parameters taken into account for such calculation, which may result in the aircraft being operated at a non-optimal aircraft performance leading to an increase in the aircraft operating costs in terms of maintenance and fuel consumption.

In M. Zontoul paper, "Rule based Aircraft Performance System", presented at International Journal of Soft Computing and Engineering (IJSCE) in September 2013, an EFB software is provided for calculating the aircraft performance using the aircraft's Manufacturer Module (MM) e.g SCAP module. The user via the EFB device selects the required parameters from a global EFB database, which contains in addition to the performance parameters a set of rules indicating how the parameters can be combined together. Once the desired performance parameters are selected the EFB software communicates with the Manufactured Module (MM) via a predefined interface. The MM performs the calculation and the results are communicated to the EFB software for displaying to the user. A major limitation of the EFB software presented in this paper is that the user is still required to select the performance parameters, which as previously mentioned is human error prone and may lead to the incorrect calculation of the aircraft performance resulting in the unsafe operation of the aircraft. Moreover, the EFB software uses a Manufacturer Module (MM) for performing the calculations. As previously discussed, the MM offers limited flexibility in the way the aircraft performance is calculated and cannot accommodate the generation of different usage scenarios according to the airlines' requirements.

DISCLOSURE OF THE INVENTION

It is an aim of the present invention to provide a system for determining aircraft performance for at least one flight phase, which does not show at least one of the drawbacks of the prior art.

It is another aim of the present invention to provide a method for determining aircraft performance for at least one flight phase, which does not show at least one of the drawbacks of the prior art.

These aims can be achieved according to the invention with the system and method according to the independent claims.

According to an aspect of the present invention, a system for calculating the aircraft performance for at least one flight phase is provided. Examples of flight phases are the following, without being limited thereto: take-off, climb, cruise and landing.

According to embodiments of the present invention, the system may be provided with a first terminal comprising means for connecting to a first, second and third repository modules. The connecting means may comprise electronic connections or any known wired or wireless communication means for connecting the first terminal to remote data repositories. The repository modules collectively may be part of a database system or a data store. Alternatively, each of the repository modules may represent a separate database system or data store. Furthermore, the first and second repository modules may be part of a Manufacturer Module (MM), such as a SCAP module. The first repository module comprises at least a first set of data files, each comprising performance lookup tables containing performance values corresponding to an aircraft flight manual (AFM) associated with a given aircraft type and/or variant (e.g. Bombardier Dash 7, Dash 8-100, Dash 8-200, . . . , Airbus A300, A320, A380, . . . , Boeing 717, 737, 757, 767, . . . , etc.). The second repository module comprises a second set of executable scripts, each associated with at least one data file from the first set of data files and further comprising a series of steps for processing the at least one data file based on predefined rules, based on the same AFM as the associated data file(s). This means that the at least one data file and the associated predefined rules are extracted from the same aircraft flight manual (AFM) or are provided for the same aircraft type and/or variant. The third repository comprises a third set of configuration files, each identifying the configuration settings of a specific aircraft of the aircraft type and/or variant.

A first user interface may be provided in the first terminal, arranged for interacting with a first user, preferably a first user having appropriate qualifications for adapting aircraft settings or the like, e.g. a pilot or other highly trained personnel. This means that the first user interface is preferably technically adapted or optimised for interaction with this type of user and is preferably a graphical user interface. The first user interface is arranged for allowing the user to consult and/or set a set of input parameters comprising at least information relating to environmental conditions and information relating to the aircraft type and/or variant and aircraft settings. The set of input parameters may be defined based on the selection of a configuration file from the third repository module. The configuration file may for example define which input parameters are provided to the first user interface, provide already some pre-set values for some parameters and for other input parameters some possible values or ranges. In other words, the configuration file configures the first user interface, or at least part thereof.

The system may be further provided with a second terminal for accessing via a second user interface at least the configuration settings defined in the configuration files stored in the third repository. This second terminal may be arranged for interacting with a second user type, preferably a second user having appropriate qualifications for writing or adapting the configuration files or settings, e.g. a performance engineer. This means that the second user interface is preferably technically adapted or optimised for interaction with this type of user. The second user interface may be a graphic user interface, a command line interface, a text editor or any other user interface deemed suitable by the skilled person. The second terminal comprises means for connecting to at least the third repository, so that the second user can access the configuration files and the settings defined therein or store new configuration files. The connecting means may comprise electronic connections or any known wired or wireless communication means for connecting the first terminal to remote data repositories.

A calling module may be provided in the system, which may be arranged for being operatively coupled to at least the first and second repositories and the first user interface. The calling module, based on the configuration file selected and the input parameters it receives, may select from the first database at least one executable script file for processing at least one associated data file. The aircraft performance may then be determined by processing the selected executable script file and associated data file or files with the input parameters by means of a calculation engine.

According to another aspect of the present invention, a method for calculating the aircraft performance for at least one flight phase is provided. The method comprises the following steps:

providing at least one electronic aircraft flight manual (AFM) for at least one given aircraft type and/or variant (e.g. Bombardier Dash 7, Dash 8-100, Dash 8-200, . . . , Airbus A300, A320, A380, . . . , Boeing 717, 737, 757, 767, . . . , etc.), each electronic AFM being organised as a first set of data files and a second set of executable scripts, each data file comprising performance lookup tables containing performance values corresponding to the AFM, each executable script being associated with at least one data file from the first set of data files and comprising a series of steps for processing the at least one data file based on predefined rules;

providing a third set of configuration files, each identifying the configuration settings of a specific aircraft of the aircraft type and/or variant;

providing, on a first terminal, a first user interface arranged for interacting with a first type of user having appropriate qualifications for adapting aircraft settings or the like, e.g. a pilot, the first user interface being arranged for allowing the user to consult and/or set a set of input parameters comprising at least information relating to environmental conditions and information relating to the aircraft type and/or variant and aircraft settings, the set of input parameters being defined based on the selection of a configuration file from the third repository module;

providing, on a second terminal, a second user interface for accessing at least the configuration settings defined in the configuration files, the second terminal being arranged for interacting with a second type of user having appropriate qualifications for writing or adapting the configuration files or settings, e.g. a performance engineer;

providing a calling module which, based on a selection of a configuration file and input parameters received via the first interface, selects at least one executable script file and at least one associated data file for processing by a calculation engine;

providing the calculation engine, arranged for determining the aircraft performance by processing the selected executable script file and associated data file or files with the input parameters.

It has been found that the system and method, according to embodiments of the present invention, may have one or more of the following advantages.

As a result of the organisation of the data such that the configuration files are separate from the data files and the executable scripts, together with the second user interface for accessing and adapting the configuration files, the aircraft configuration settings can be managed separately from the other data by the person having the appropriate qualifications, e.g. the performance engineer of the airline. The data files and the executable scripts are derived from, or based on, the AFM, so are managed by a for example skilled person of, or appointed by, the airline. The configuration files may contain rules, settings and the like which are for example managed by the airline operating the aircraft. These rules, settings and the like may be both generic for all aircraft of the same type and/or variant or be aircraft specific. The aircraft performance for the flight phase is finally under the responsibility of the pilot in command of the flight or another highly skilled person, but should be determined on the basis of the other data, i.e. the data files and executable scripts which are the responsibility of the manufacturer as well as the configuration files which are the responsibility of the airline. To summarize, it is clear that the different elements needed for a performance calculation may be managed by, or under the responsibility of different skilled persons with different qualifications. With the system and method according to the invention, it can be ensured that the different elements (data files, scripts, configuration files and input parameters) are effectively managed by the person having the appropriate qualifications. Furthermore, by separating the elements into the data files, executable scripts and configuration files, updates to the system and method can be carried out more easily and more quickly.

As a result of the use of the configuration files, which define the set of input parameters that is provided to the first user for consultation and/or setting, and the calling module and calculation engine which subsequently process the associated data files and executable script, mistakes can be avoided and safety can be enhanced. For example, mistakes made by the pilots manually using the AFM for the selection of the performance charts for the aircraft type and/or variant, or the selection of values from the table or column/row in the performance charts can be significantly reduced. Therefore, with the system and method of the present invention the integrity and speed of the aircraft performance calculations may be considerably enhanced by avoiding manual steps that risk human errors and optimising the human-system interaction. Furthermore, it has been found that the use of a dedicated calculation engine may significantly accelerate the processing of the performance look up tables obtained by means of the calling module, thereby overall improving the speed at which the resulting aircraft performance calculations are reported to the user.

The system and method according to the embodiments of the invention may further be fully compatible with existing Manufacturer Modules (MM), e.g. as SCAP modules, provided by the aircraft manufacturer or a third party, which may be accessed via a predefined communication interface, for processing the performance tables in the data files selected. The system and method according to the invention may thus be compatible with different aircraft types and airline requirements.

According to embodiments of the present invention, any of the first set of data files, the second set of executable scripts and the third set of configuration files may be in predetermined formats that facilitate reading by humans. To this end, the configuration files may for example be in a mark-up language, e.g. XML, i.e. a language that does not require a software developer for adaptation of the content. This can enable the airline to easily adapt on demand the information contained therein without the need of a software developer to be present. For example, a performance engineer may adapt the configuration files via the second terminal so that the aircraft performance is always calculated by taking into account additional parameters, such as specific aircraft configuration settings. In another example, a performance engineer may adapt after maintenance or modification of the aircraft via the second terminal one of the configuration files to include the new configuration settings for a specific aircraft. As a result, the maintenance and creation of at least the configuration files can be performed at the airline site in a quick and easy manner without the need of specialised personnel having computer programming knowledge, thereby reducing the associated cost and time required for preparing such files.

According to embodiments of the present invention, an input parameter received via the user interface may comprise an optimisation goal selected from a set of optimisation goals for optimising the aircraft performance. For example, an airline may desire all of its aircrafts to operate at optimum fuel efficiency irrespective of the aircraft load or the weather. Other optimisation goals may include but not limited to, minimum runway length, maximum take-off mass, minimum maintenance cost, maximum landing mass, optimum cruise speed, optimum cruise altitude, minimum time to destination, maximum performance (comprises both take-off and landing), optimum obstacle clearance, and the like. The calling module of the present invention upon receiving the optimisation goal may perform a number of performance calculations using the calculation engine, for example by varying certain parameters or by using different executable scripts, so as to provide to the user the aircraft performance that closely matches the optimisation goal selected while ensuring the safe operation of the aircraft. The optimisation goal may be set by the user e.g. the pilot, during the aircraft performance calculation, or may be pre-set in the logic of the calling module or in any one of the data files, executable scripts or configuration files. Therefore, with the system and method of the present invention, the user may able to run a number of usage scenarios in short amount of time for identifying the aircraft performance that best matches the optimisation goal set by the airline. As a result, the user may optimise the aircraft performance calculation on demand, thereby ensuring that the aircraft is operated during the flight in the most optimum way so as to conserve fuel and reduce maintenance costs.

According to embodiments of the present invention, the calling module may comprise a business logic module arranged for selecting, based on the optimisation goal, a set of input parameters to be varied within an applicable range by the calculation engine for optimising the aircraft performance calculation towards the optimisation goal. For example, the predetermined rules may be an optimisation function arranged for varying within a predefined range at least some of the input parameters. The business logic may implement airline specific rules or aircraft type specific rules within a given airline, which may ensure that the aircraft performance is always optimised according to airline requirements without the need for the user to provide an optimisation goal. Furthermore, the settings of the business logic may be accessible to the airline for adaptation, thereby allowing the airline to apply new rules for optimising the aircraft performance calculations. According to embodiments of the present invention, the predefined range for varying the input parameters may be provided in the configuration files, adaptable via the second user interface. Alternatively, the predefined range may be provided in the business logic according to the airline requirements or the aircraft manufacturer. The functionality of the business logic may be adapted by the user via the second interface of the second terminal, or via other means, depending on the airlines or aircraft specific requirements.

According to embodiments of the present invention, the calling module may be arranged for validating the input parameter values received via the user interface against predefined numerical limits and aircraft operational limits specified in any one of the data files, executable scripts or configuration files stored in the first database. As a result, human errors may be significantly reduced by performing a validity check on the values or selections received or made prior to performing the aircraft performance calculation, thereby improving the accuracy of the aircraft performance calculated.

According to embodiments of the present invention, the calling module may be arranged for storing the results obtained from the aircraft performance calculations. For example the results may be stored in the form of log files containing information with regards to the steps taken by the calling module to calculate the aircraft performance, the input parameters received through the user interface and the results obtained, or any other information or combination of information thereof. The log files may be analysed offline by the airline to determine whether the system performs according to specification and whether the correct input parameter values were used in the aircraft performance calculation, thereby enabling the airline or other third parties to take appropriate action when necessary.

According to embodiments of the present invention, the calling module may be arranged for displaying the aircraft performance calculation results on a user display, which may be part of an electronic device. For example, the aircraft performance calculation results may be displayed on the user display as an overlay layer on top of other computer software applications or aircraft specific applications, such as computerised navigation charts. As a result, the user is provided with a unique combination of information enabling him to take a more informed decision on the operation of the aircraft.

According to embodiments of the present invention, the first set of data files, second set of executable scripts and the third set of configuration files may be encrypted using an encryption algorithm. In this way, it can be ensured that only authorised personnel can access and adapt the information of the data files, thereby preventing accidental data corruption of the data contained therein.

According to embodiments of the present invention, the system may comprise a synchronise module for separately updating the data files, executable scripts and configuration files stored respectively in the first, second and third repositories. For example, before the flight commences, the pilot or other airline personnel may update the data files, executable scripts and configuration files and associated environmental data stored in a central database, such as the current weather conditions, runway condition, aircraft configuration settings, and the like. As a result, it can be ensured that the aircraft performance may always be calculated using up-to-date data, thereby increasing the accuracy of the resulting aircraft performance. Furthermore, the synchronise module may be used for updating the data stored in a central database, such as an airport database, which may be connected to or form part of the system of the present invention, for providing information related to a number of parameters, such as the weather conditions, runway conditions and the like.

According to embodiments of the present invention, the system and method may further comprise a test module accessed via the second terminal user interface for testing the integrity of the aircraft performance calculation performed by calculation engine. For example, an airline performance engineer may access via the second terminal the test module to determine if the aircraft performance calculated against known input values matches a pre-calculated aircraft performance. As a result, the system and method of the present invention offers a quick way of validating updates and assessing whether the system operates according to specification, which can be used both by ground airline personnel for load planning purposes as well by the pilots prior to performing an actual performance calculation.

According to embodiments of the present invention, the first terminal may be a standalone device, such as a device fixed on board the airplane, or a mobile terminal, such as a portable computer, a tablet computer and the like, on which the first user interface is implemented by software. The first terminal may further comprise one or more of the following: the calling module, the calculation engine and the first, second and/or third repositories. This mode of operation may be generally referred to as offline mode. Alternatively, the part of the system implemented on the first terminal may be minimised, with the components provided on a remote server and accessed via a predetermined communication interface, such as a web interface, by the pilots or other personnel using the first terminal for determining the aircraft performance. This mode of operation may be generally referred to as online mode.

According to embodiments of the present invention, the first terminal may be, or comprise, an EFB. For example, the EFB may be integrated in an electronic device such as a tablet device containing in a digital version the set of documents required by the pilot during the aircraft flight such as the AFM, the aircraft operating manual, flight-crew operating manual, and navigational charts, including moving map for air and ground operations. The EFB devices may be generally classified in two categories namely: a) Portable EFB, which is a portable EFB host platform, used on the flight deck, which is not part of the certified aircraft configuration such as a Portable Electronic Device (PED), and b) Installed EFB, which is an EFB host platform installed in the aircraft and considered as an aircraft part, covered, thus, by the aircraft airworthiness approval.

In embodiments according to the invention, the first user interface is arranged for receiving an identifier specifying the specific aircraft and a specific flight, which triggers the following steps: (i) selecting, in a repository where the data files and executable scripts are stored, a subset of the data files and scripts for the aircraft type and/or variant matching the specific aircraft (ii) selecting, in a repository where the configuration files are stored, the configuration file relating to the identified specific aircraft; (iii) defining, on the basis of the selected configuration file, the set of input parameters for the first user interface, which includes collecting information relating to environmental conditions relevant for the identified flight. The identifier may be inputted directly on the first terminal by the first user, or alternatively be collected as a result of a login of the first user on the first terminal, or otherwise.

BRIEF DESCRIPTION OF THE DRAWINGS

The invention will be further elucidated by means of the following description and the appended figures.

MODES FOR CARRYING OUT THE INVENTION

Figure 1:
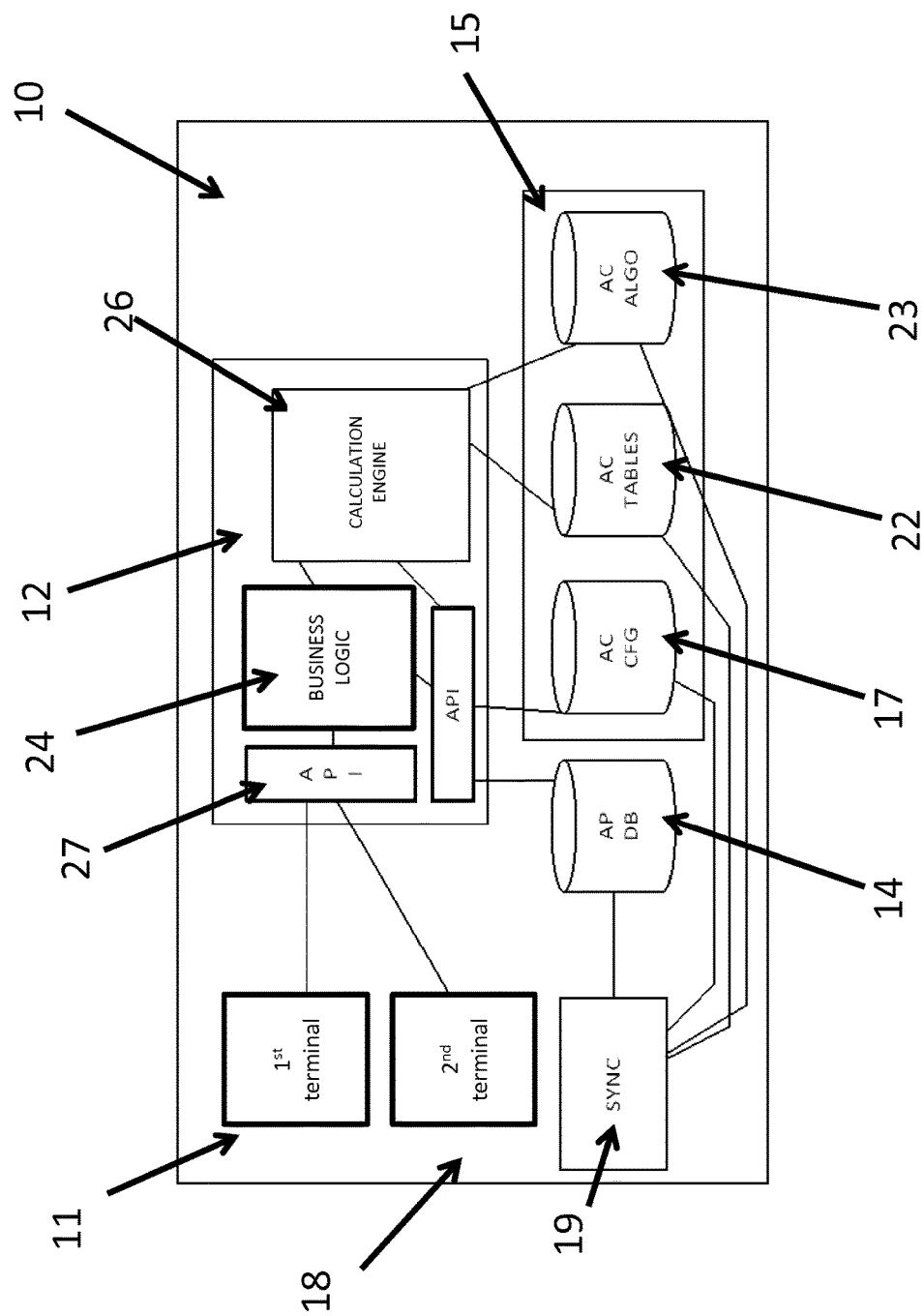
FIG. 1 shows an example of the system according to embodiments of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The system and method for calculating the aircraft performance according to embodiments of the present invention will now be described with reference to the exemplified embodiments of the invention shown in FIGS. 1 to 4. The term aircraft performance refers to the ability of the aircraft to operate safely under specific environmental and loading conditions during the flight phases of take-off, climb, cruise and landing. The aircraft performance involves the calculation of a speed or set of speeds and a corresponding power or thrust setting that will guarantee the safe operation of the aircraft during the different flight phases based on a set of input parameters such as the environmental conditions, the aircraft loading and others. For example, for the take-off flight phase the aircraft performance may include among others the speed V1 of the aircraft at the point of decision during the take-off roll, the speed VR indicating the rotation speed of the aircraft on the runway, and the speed V2 indicating the speed of the aircraft after take-off. To enhance the accuracy of the aircraft performance and therefore the safety, the calculation may be supplemented with additional input parameters related to the aircraft configuration such as the flap and thrust or power settings. Therefore, the aircraft performance needs to be calculated not only with regards to the exact aircraft type but also taking into account the aircraft unique configuration settings in order to ensure the safe operation of the aircraft during the different flight phases.

Aircraft "type" and "variant" are known definitions according to the regulations. For example, a "type" is Airbus A320, with A319 being considered a "variant" according to the regulations. An AFM may cover one or more aircraft types and one or more variants of the aircraft type(s).

FIG. 1 shows an example of a system 10 for determining the aircraft performance according to embodiments of the present invention. The system 10 may comprise a user interface accessible via a first terminal 11, such as a graphic user interface, via which a user, being a user of a first type having appropriate qualifications for adapting aircraft settings, such as for example a pilot, may input or select certain parameters that are used by the system 10 for determining the aircraft performance. The input parameters may include aircraft settings e.g. the aircraft loading and flap and power or thrust setting, environmental conditions e.g. temperature and wind speed or other information. The values or ranges for such input parameters are provided via a central database 14, such as an airport (AP) database, which may include information related to a given airport such as the latest weather forecast, the condition of the runway, information related to obstacles located near the runway, and/or updated configuration settings of the aircraft. The first user may further select via the first terminal 11 a configuration file from a number of configuration files 17 provided in a database 15, which identifies the aircraft type and its configuration settings available. This selection can be directly or indirectly, e.g. the selection is triggered by a login or entering flight details or the like. It should be noted that the configuration file 17 may also be pre-selected such that the first user does not have to perform the selection step, thereby reducing the steps required for determining the aircraft performance. The database 15 may contain in addition to the configuration files 17, a set of data files 22 comprising performance lookup tables containing performance values extracted from an Aircraft Flight Manual (AFM) associated with a specific aircraft type, and a set of executable scripts 23 each associated with at least one data file 22 from the first set of data files 22 and comprising a series of steps for processing the at least one data file based on predefined rules extracted from an Aircraft Flight Manual (AFM). The user may further select a set of program options via the user interface 11 such as the aircraft performance margins accounting for assumptions regarding the weather, the flight crew, the runway and the aircraft. As previously, it should be noted that the program options may be pre-selected for a specific aircraft. Furthermore, the program options may be stored in a database, such as the database 15. It should be noted that FIG. 1 represents only one example of how the set of configuration files 17, the set of data files 22, and the set of executable scripts 23, may be stored and that other implementations are possible. For example, separate databases may be provided for storing the different set of files and scripts required according to embodiments of the present invention.

The system further comprises a calling module 12, which comprises a calculation engine 26 arranged for determining the aircraft performance. The calling module 12 is arranged for selecting, based on the input parameters and configuration file 17 selected, at least one executable script file 23 for processing at least one associated data file 22. The calculation engine 26 determines the aircraft performance by processing the selected data file 22 or files according to the at least one executable script 23, using the input parameters as variables. The calling module 12 is arranged for communicating the resulting aircraft performance via the first terminal 11 to the first user, where it is displayed in the user's display. For example, the resulting aircraft performance may be provided to the user as an overlay on other computer application programs, such as navigation charts and the like, thereby enhancing the user decision making process by collectively displaying a set of information. Furthermore, the calling module 12 may be arranged so that prior to performing the calculation it checks whether the values supplied as input parameters are within expected numerical ranges by comparing the values received with values stored in any of the files in the first database. The calling module 12 may be further arranged to alert the user in the case of the values not being within the expected range, thereby preventing mistakes propagating into the aircraft performance calculations.

The system 10 of the present invention provides that the performance data and associated aircraft performance calculation steps can be performed by the calling module based on the set of input parameters set via the user first interface and the selected configuration file, which defines the set of input parameters (i.e. the availability and possible values). As a result, mistakes made by the pilots due to inputting the wrong parameter values can be significantly reduced. Therefore, with the system of the present invention the integrity and speed of the aircraft performance calculations can be considerably enhanced by avoiding at least some of the manually performed steps and optimising the human-system interaction compared to the solutions found in the prior art. Furthermore, by providing a dedicated calculation engine 26 for performing the processing of the selected data files 22, the speed and accuracy of the aircraft performance may be significantly enhanced.

According to embodiments of the present invention, the system may comprise a second terminal 18 having a second user interface via which a second user, having appropriate qualifications for adapting the configuration files, e.g. a performance engineer, may access at least the configuration files 17 to update the configuration settings related to the aircraft types available for selection. Furthermore, the second terminal 18 may be arranged to provide access to the user to the data files 22 and executable scripts 23. In general, the second terminal may be used to access and if required configure the functionality of the system 10 and related files associated with the calculation of the aircraft performance.

According to embodiments of the present invention, the system 10 may be compatible with existing SCAP modules provided by the aircraft manufacturer or a third party, which may be accessed via a predefined communication interface for processing the performance tables in the data files selected, thereby ensuring compatibility with different aircraft types and airline requirements.

Figure 2:
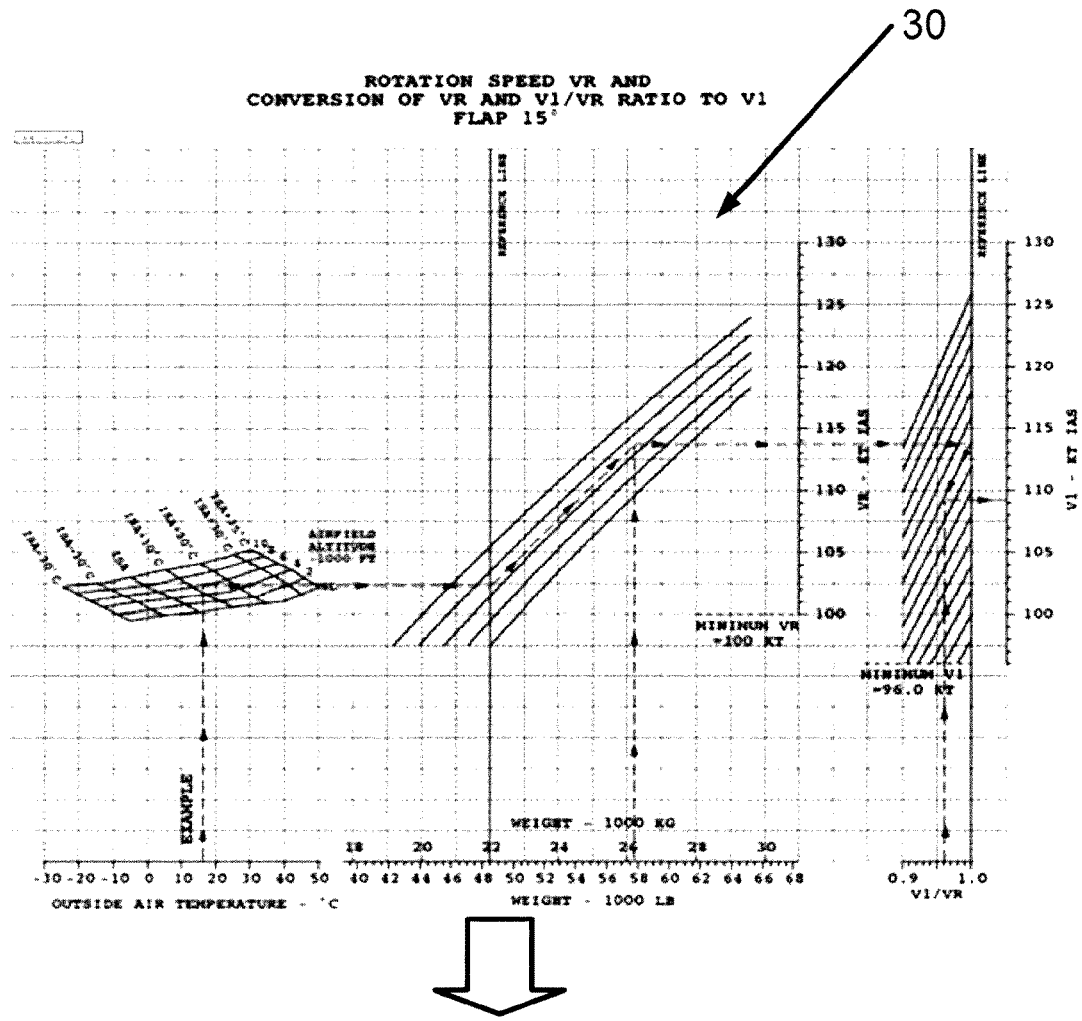
FIG. 2 shows a conversion example of a paper-based Aircraft Flight Manual performance graph to a digital format according to embodiments of the present invention.

According to embodiments of the present invention, the calling module 12 may comprise a business logic module 24, as shown in FIG. 2. The business logic module 24 is used for optimising the aircraft performance calculation according to an optimisation goal received by the user through the user interface 11. For example the optimisation goal may include but not limited to optimum fuel consumption, minimum runway length, maximum take-off mass, minimum maintenance cost, maximum landing mass, optimum cruise speed, optimum cruise altitude, minimum time to destination, maximum performance. The business logic module 24 is arranged for selecting, based on the optimisation goal, a set of input parameters according to a set of predetermined rules to be varied within a predefined range, while taking into account safety margins, by the module performing the calculation such as the calculation engine 26, or SCAP engine (not shown). The business logic module 24 may implement airline specific rules, which may ensure that the aircraft performance is optimised according to airline requirements without the need for the user to provide an optimisation goal. Furthermore, the settings of the business logic module 24 may be accessible to the airline for adaptation via the second terminal, thereby allowing the airline, i.e. the second user with the appropriate qualifications, e.g. the performance engineer, to apply new rules for optimising the aircraft performance calculations. According to embodiments of the present invention, the predefined range for varying the input parameters may be provided as an input to the calling module 12 via the user interface. Alternatively, the predefined range may be provided in the business logic module 24 according to the airline requirements or the aircraft manufacturer. It has been found, that the use of a business logic 24 for optimising the aircraft performance may significantly reduce the airline operating costs with regards to fuel efficiency and aircraft maintenance. Moreover, the use of a business logic module 24 may provide a flexible environment enabling the first user to run multiple usage scenarios for optimising the aircraft performance in a short amount of time.

According to embodiments of the present invention, the calling module 12 is arranged for storing the results obtained from the aircraft performance calculations. For example the results may be stored in the form of log files containing information with regards to the steps taken by the calling module 12 to calculate the aircraft performance, the input parameters received through the user interface and the results obtained, or any other information or combination of information thereof. The log files may be analysed offline by the airline to determine whether the system performs according to specification and whether the correct input parameter values were used in the aircraft performance calculation, thereby enabling the airline or other third parties to take appropriate action when necessary. The log files may be stored either locally in a storage area of the system, such as the memory of an electronic device, or in a server in the case where the system is used remotely via a web interface. In the case of a web interface, or otherwise referred to as online mode, the analysts may have direct access to the log files, such that they can provide instant feedback on the accuracy and optimisation of the performance calculation to the person operating the system.

According to embodiments of the present invention, the calling module 12 may further comprise Application Programming Interface (API) modules 27 to ensure the correct interaction between the different system modules so as to minimise the human-computer interaction and maintain the transparency of the aircraft performance calculation to the user.

FIG. 2 presents a conversion example of a paper-based AFM performance table or graph to a digital format. As previously mentioned, data files 22 may include at least one performance table containing performance values extracted from an AFM or any other performance information required by the aircraft certification regulations, and any additional performance information the manufacturer deems important to safely operate the aircraft. For example the data files 22 may include values represented in a graph or table for converting calibrated airspeed to true airspeed; stall speeds in various configurations; and data for determining take-off and climb performance, cruise performance, and landing performance. As an example, the performance graph 30 shown in FIG. 3 may be used for determining the rotation speed VR and for converting the VR with respect to the flap setting. The value in the paper-based performance graph 30 is converted in a digital look-up table 31. The digital look-up table 31 may be in a digital file format that is compatible with a variety of software applications, such as Comma Separated Values (CSV), or the like. On the other hand, the operating instruction detailed in the AFM for calculating the aircraft performance based on the input parameters may be digitised in a set of executable scripts 23. For example, the executable scripts 23 may indicate for the specific aircraft type the calculation steps to be followed for determining the aircraft performance required for taking-off from short distance runway at a given wind speed and temperature.

In embodiments according to this disclosure, the digitisation process of the paper-based AFM is performed by digitising only certain points of the AFM graphs and subsequently interpolating the values between the selected points. The number of graph points are selected based on the mathematical function of the AFM graph. For example, an AFM graph having a (approximately) linear function may require the digitization of only two points since the remaining points may be calculated using an interpolation method. On the other hand, for an AFM graph having a polynomial function more than two points may be used to divide the graph into a number of (approximately) linear segments and applying the interpolation between the points defining each of the linear segments. This digitisation method described above may be beneficial in that it may be performed very quickly since only a limited number of selected points in the graph need to be digitized.

The aircraft settings detailed in the AFM may further be digitised in a set of configuration files 17 each identifying a specific aircraft of the aircraft type and its configuration such as Minimum Equipment List (MEL) items, power or thrust settings, flap settings, and more. The configuration files 23 may be in an easy to understand human-readable mark-up language, such as for example XML and the like, thereby enabling a person not having computer programming knowledge to create and adapt the configuration files 17. For example, a performance engineer at the airline site may adapt via the second terminal 18 the configuration files according to the airlines requirements. As a result, changes to the configuration files 23 can be performed on site at a reduced cost compared to the use of a software developer.

According to embodiments of the present invention, at least the data files 22 containing the performance tables and the executable scripts 23 may be encrypted using an encryption key. Moreover, these files may also have access restrictions, thereby ensuring that access to such files is restricted only to authorised personnel, thereby preventing accidental or malicious changes to the files that may compromise the safety of the aircraft.

According to embodiments of the present invention, the system 10 may further comprise a test module (not shown) which is accessible via the second terminal 18 to enable the operator to validate configuration files or settings, or adaptations thereof, and/or to test the accuracy and overall performance of the calling module 12 and calculation engine 26. The operator may supply via the second terminal 18 known performance values to be calculated by the calling module 12 and compare the calculated aircraft performance with expected results so as to validate the configuration files or settings, or adaptations thereof, and/or to determine the performance of the system 10. For example such a check may be performed prior to the flight commencing so as to identify any inconsistencies in the files or operation of the system 10. Depending on the outcome, the operator may decide to optimise the way the aircraft performance is calculated by for example adapting the business logic module 24 accordingly. The user may use the test module 18 using a graphical or a command line interface, or any other user interface type available in the state of the art.

According to embodiments of the present invention, the system 10 may be operatively coupled to a central database 14, such as an airport (AP) database, which may include among others information related to a given airport such as the latest weather forecast, the condition of the runway, information related to obstacles located near the runway, and the like. The information in the AP database 14 may be updated regularly so as to make sure that the user of the system 10 is provided with the latest available information for calculating the aircraft performance, thereby increasing the accuracy of the aircraft performance calculation. For example, prior to landing at a given airport, the user may access the central database 14 to obtain an updated weather forecast for calculating the aircraft performance under the environmental conditions at the destination airport.

According to embodiments of the present invention, the system 10 may comprise a synchronise module 19 for updating separately the data files 22, executable scripts 23 and configuration files 17 so as to ensure that the information used in the aircraft performance calculation is always up-to-date. Furthermore, the synchronisation module 19 may be further used to ensure that the information used for the aircraft performance calculation are valid and match the information held by the airline or other authorised authority in a central database, such as the airport database 14. Moreover, the synchronisation module 19 may be used to separately update the central database 14.

According to embodiments of the present invention, at least the data files containing the look-up tables 22 and the executable scripts 23, may form a digitised Aircraft Flight Manual (AFM).

According to embodiments of the present invention, the system 10 or parts of the system 10 may be implemented as a standalone device or form part of an electronic device such as an EFB device. For example, the calling module 12 may be part of an EFB device while the first database 15 may be located in a remote server, which can be accessed via a communication interface. According to embodiments of the present invention, part of the system of the present invention may further be permanently installed in the aircraft. The system 10 or parts of the system may be implemented using discrete components. Furthermore, the system 10 or parts of the system 10 may be implemented as a computer program, stored in a non-transient memory of an electronic device, which when executed by the processor of the electronic device determines the aircraft performance according to any of the embodiments presented above. Moreover, the system may be implemented in its entirety in a remote server accessed via a predetermined communication interface, such as a web interface, by the pilots or other personnel for determining the aircraft performance. The web interface access may also be referred to as an online mode.

According to embodiments of the present invention, the system 10 or parts of the system 10 may be implemented using software, which can be installed in the form of a standalone program, such as a mobile application, in a variety of electronic devices such as mobile phones, tablets, personal computer, and the like. For example, the calling module 12 and the calculation engine 26 may be implemented as one or more software programs, which when installed in the electronic device is/are arranged for receiving information via the graphic user interface of the electronic device and communicate with the first database 15 located either locally or remotely for determining the aircraft performance. The system of the present invention in the form of the standalone program may be downloaded from a secure database accessible via a communication network. For example, in the case of a mobile application, the first user interface, calling and calculation modules, and possibly the database files or parts thereof can be simply downloaded and installed, and also updated, from a mobile application directory such as Apple's App Store or the Microsoft Application Store. The system 10 may be compatible with a variety of operating systems, such as Windows, IOS, Android, Linux, and the like.

Figure 3:
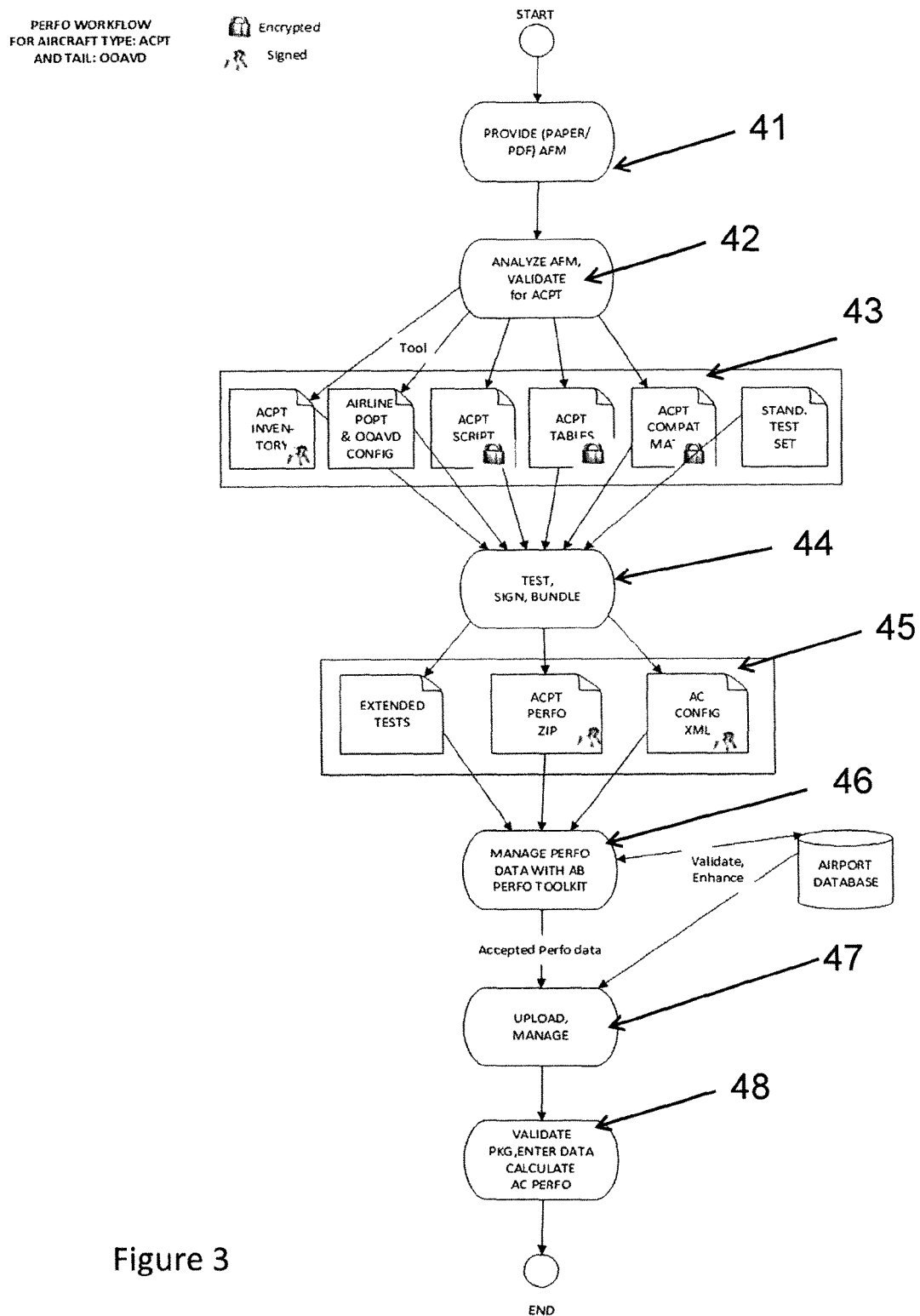
FIG. 3 shows an example of a process for generating from an Aircraft Flight Manual the files required for calculating the aircraft performance according to embodiments of the present invention.
Figure 4:
FIGS. 4a to 4f show examples of a set of input parameters available to the user for selection via a graphic user interface of an electronic device comprising the system of the present invention.
Figure 4:
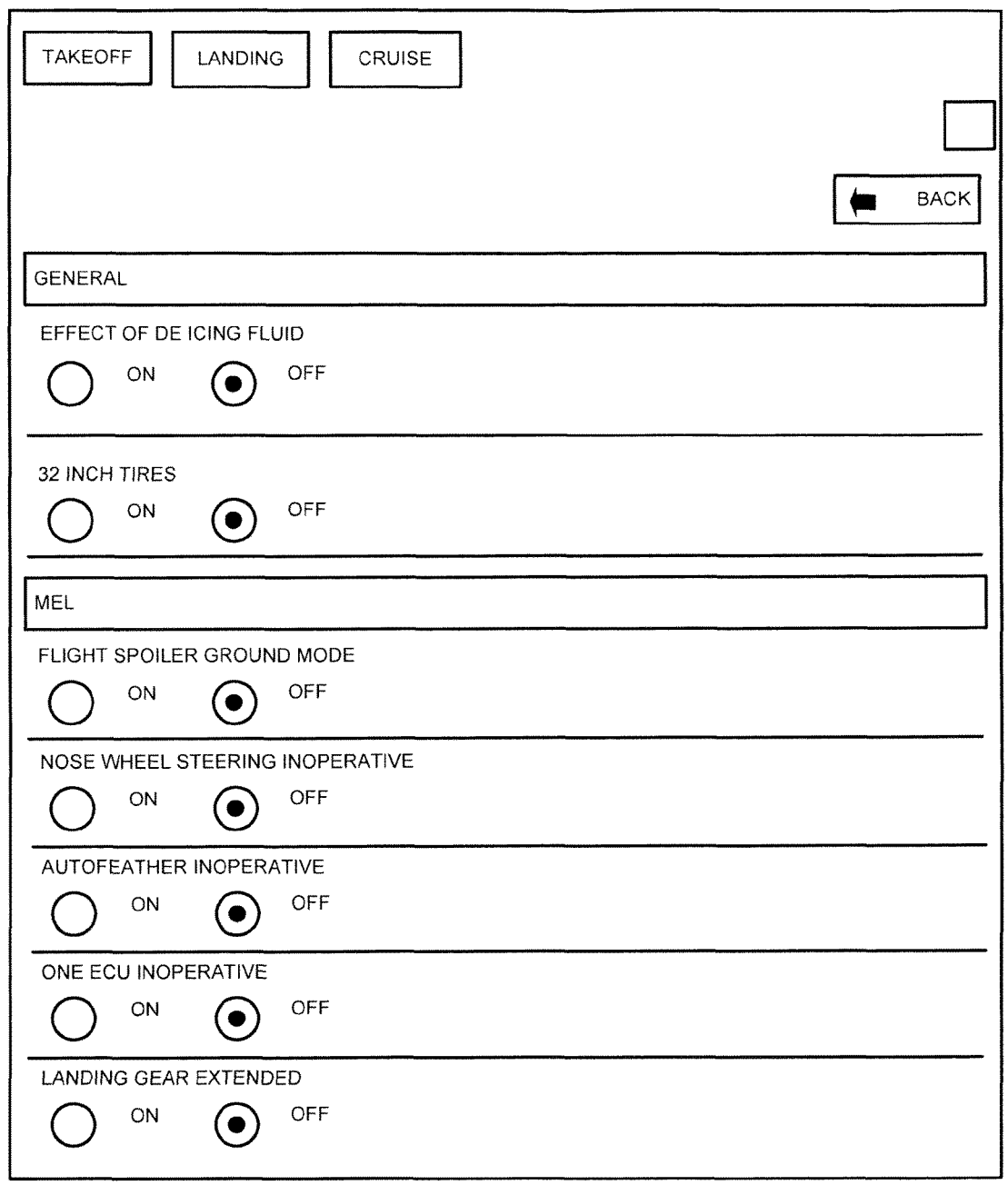
Figure 4:
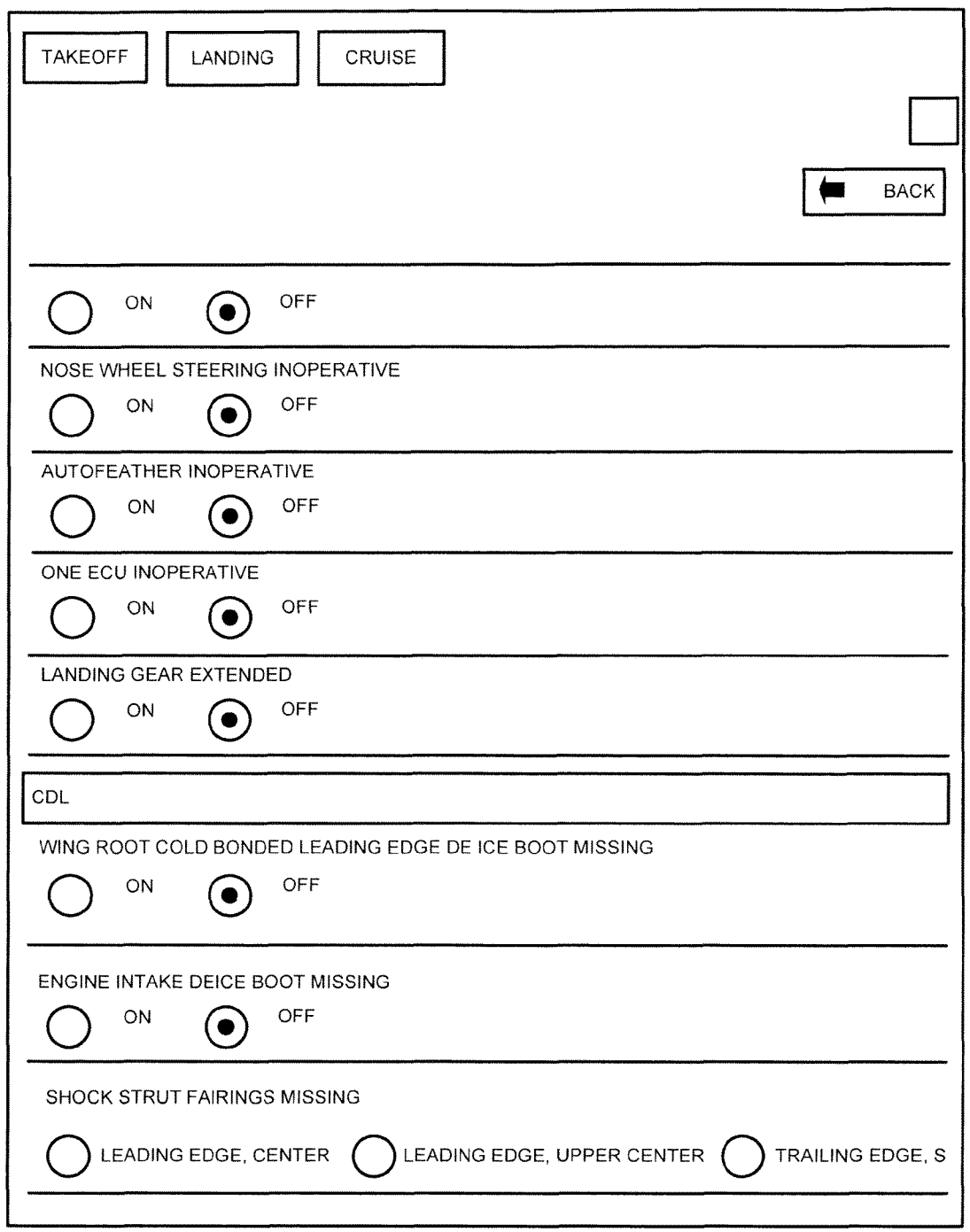
Figure 4:
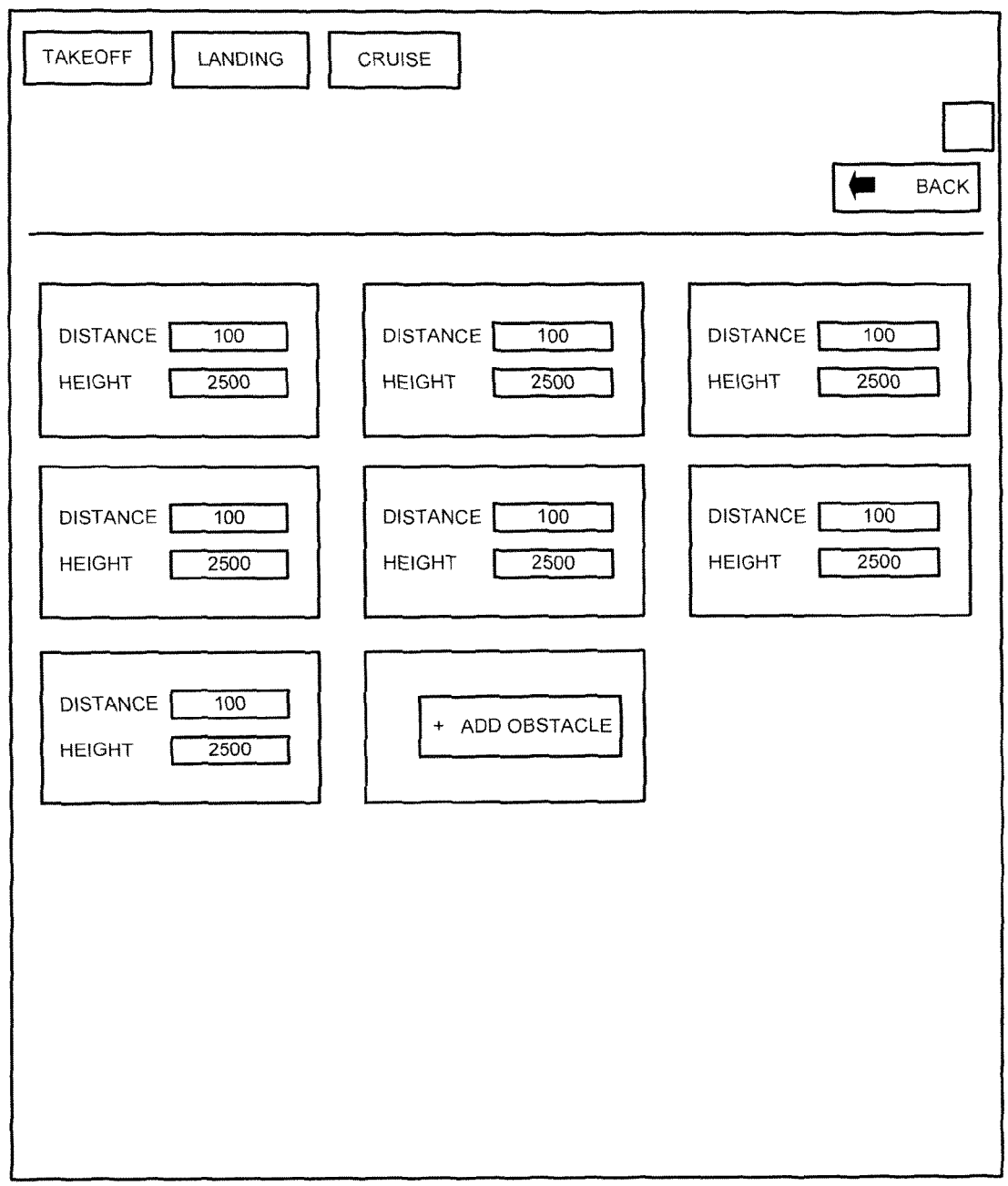

FIG. 3 shows an exemplified procedure for digitizing and distributing the digital Aircraft Flight Manual (AFM) created according to embodiments of the present invention. The process starts at step 41 by receiving the AFM in either paper-based or in SCAP format from a certified authority such as the aircraft manufacturer. The data in the AFM may be then analysed and validated by a certified performance engineer at step 42 to ensure the correctness of the AFM files received. The AFM file received can then be converted into a collection of digital files at step 43 by the certified performance engineer or other certified personnel. The collection of digital files may include but not limited to the data files 22, referred to as ACPT tables, the executable scripts 23, referred to as ACPT scripts and a set of standard tests for validating the aircraft performance calculated. At least the ACPT tables may become available to an airline performance engineer for inspection and optimisation. For example, the airline using the performance data collected from other similar type aircraft may modify the ACPT tables. Once all required files have been created the certified performance engineer from step 42 performs the necessary validation tests to make sure all data contained in the files is correct and signs the files using an authorisation code at step 44. The files may then be bundled at step 45 into a collection of files before they are distributed to the airline, for example, configuration files may be provided separately from the performance and test files. At step 46 an airline performance engineer may receive the bundled files from step 45 and performs airline based tests to ensure the validity of the data contained therein.

The airline performance engineer may further update the content of the bundled files using an Airport database and provide a compliance report to the competent Civil Aviation Authority. The competent Civil Aviation Authority may then validate the files by checking whether they satisfy the safety operating rules. Furthermore, the collection of files may be uploaded to the Airport database so that they can be distributed to all connected systems. At step 56 the bundled files are uploaded to an electronic device. For example in the case where the first terminal of the present invention is an EFB device, the bundled files may be uploaded in the memory of the device by the administrator or the user of the device. Finally, at step 47 the pilot may use the bundled data in combination with the system of the present invention via a user interface to determine the aircraft performance.

In the case where the system 10 according to embodiments of the present invention comprises a mobile application as previously described, the pilot may use the dedicated mobile application to access the files and determine the aircraft performance for at least one flight phase according to embodiments of the present invention.

FIGS. 4a to 4f show examples of a set of input parameters available to the user for selection via the graphic user interface of the first terminal 11 of the system 10 according to embodiments of the present invention. As shown in FIG. 4a, the user may be provided with a number of parameters for selection on the graphic user interface. The user at first may select the flight phase for which he wants to calculate the aircraft performance by selecting one of the applicable options identified as TAKEOFF, LANDING and CRUISE. For this example, it is assumed that the user has selected the TAKEOFF option. It should be noted that each of the flight phase options may include a different set of parameters available for selection. The user, prior to performing the calculation, may desire to set some basic preferences. For example, the user may choose to display the weight values in kilograms rather than pounds or to display speed values in kilometers rather than knots. The user may further be provided with the options of clearing the values used in previous calculation. To perform the calculation a minimum number of input parameters may be required to be set by the user. For example, the user may input manually the weight of the aircraft and may choose whether this weight represents the Maximum Take-off Mass (MTOM) or the Actual Take-off Mass (ATOM). Alternatively, the user may import the required mass from a Mass and Balance (M&B) database or module. The user may then set certain parameters e.g. the aircraft configuration, the bleeds, the ice protection, and select options, e.g. whether the UPTRIM is disabled or not. The user may then be prompted to select from a set of runway related options of the desired runway of the relevant airport. Moving now to FIG. 4b, the user may input a set of the environmental conditions such as the wind, the temperature and the condition of the runway. Alternatively, as mentioned before, these environmental conditions may also be supplied from the airport database. The input parameters shown in FIGS. 4a and 4b represent a minimum set of input parameters required for calculating the aircraft performance. Based on these parameters the user may calculate the aircraft performance by pressing the calculate button, as shown in FIG. 4b. To enhance the accuracy of the aircraft performance calculation, an extended set of parameters may be presented to the user for selection. For example, the user may be provided with a set of parameters related to the general aircraft settings e.g. the effect of de-icing fluid, as shown in FIG. 4c. Depending on the configuration file, an extended Minimum Equipment List (MEL) may be presented to the user for selection based on the aircraft type, as shown in FIGS. 4c and 4d. A list of Configuration Deviation List (CDL) may be further provided to the user for selection, which identifies any external parts of an aircraft type that may be missing at the commencement of a flight, and which contains, where necessary, any information on associated operating limitations and performance corrections. A further list of parameters relating to the runway of the desired airport may be selected by the user, as shown in FIG. 4e. Finally, the user may provide information related to the obstacles located near the runway, such as their distance and height, as shown in the FIG. 4f. Once the required input parameters have been consulted and/or set, the user may perform again the calculation by pressing the calculate button in the graphic user interface, as shown in FIG. 4b. The calling module 12 of the system 10, as previously described, may then process the values of the input parameters using the calculation engine 26 and the resulting aircraft performance may be displayed in the results section of the graphic user interface, as shown in FIG. 4b.

According to embodiments of the present invention, the user may be provided with a variety of information on the graphic user interface, which include among others the weather forecast, battery life of the electronic device, the local time, the quality of the aircraft performance calculation, whether the device is operating in training mode, the ability to display the results as overlay layer on top of navigations charts, etc.

The invention claimed is:

1. A system for determining the performance of an aircraft for at least one flight phase, the system comprising:
    a first terminal comprising means for connecting to
    a first repository module comprising at least a first set of data files each comprising at least one aircraft performance lookup table containing performance values corresponding to an aircraft flight manual associated with a specific aircraft type and/or variant,
    a second repository module comprising second set of executable scripts each associated with at least one data file from the first set of data files and comprising a series of steps for processing the at least one data file based on predefined rules corresponding to the aircraft flight manual, and
    a third repository comprising a third set of configuration files each defining at least the configuration settings of the specific aircraft of the aircraft type and/or variant, the first terminal comprising a first user interface arranged for interacting with a first type of user, qualified for adapting aircraft settings, for providing and/or setting a set of input parameters comprising at least information relating to environmental conditions and information relating to the aircraft type and/or variant and aircraft settings, which input parameters are defined based on the selection of a configuration file from the third repository module;
    a second terminal comprising a second user interface arranged for interacting with a second type of user, qualified for adapting the configuration settings, the second terminal comprising means for connecting to at least the third repository, for accessing the configuration settings defined in the configuration files;
    a calling module arranged for being operatively coupled to the first and second repository modules and the first user interface, and arranged for selecting, based on the input parameters set via the first user interface and the configuration file selected, at least one executable script file for processing the associated data files; and
    a calculation engine arranged for determining the aircraft performance by processing the selected data files with the input parameters according to the associated at least one executable script file.

2. A system according to claim 1, wherein the input parameters set via the first user interface comprise an optimization goal selected from a set of optimization goals for optimizing the aircraft performance.

3. A system according to claim 2, wherein the set of optimization goals comprises at least one of the following: optimum fuel consumption, minimum runway length, maximum take-off mass, minimum maintenance cost, maximum landing mass, optimum cruise speed, optimum cruise altitude, minimum time to destination, maximum performance.

4. A system according to claim 1, wherein the calling module comprises a business logic module arranged for selecting, based on the optimization goal, a set of input parameters to be varied within a predetermined range by the calculation module.

5. A system according to claim 1, wherein the second terminal is arranged for testing the functionality of the calling module and calculation module.

6. A system according to claim 1, wherein the second terminal is arranged for being operatively connected to the first and second repository for accessing respectively the first set of data files and second set of executable scripts.

7. A system according to claim 1, wherein at least the first set of data files and the second set of executable scripts are encrypted using an encryption algorithm.

8. A system according to claim 1, wherein the calling module is arranged for validating the input parameters values received via the first user interface against predefined numerical limits and aircraft operational limits specified in at least one of the data files and configuration files.

9. A system according to claim 1, wherein the calling module is arranged for storing the results obtained from the aircraft performance calculations.

10. A system according to claim 1, wherein the calling module is arranged for displaying via the user interface the resulting aircraft performance as an overlay layer on other computer or aircraft applications, such as navigation charts.

11. A system according to claim 1, wherein the configuration files are in a predetermined format for the second type of user, preferably XML.

12. A system according to claim 1, wherein the system comprises a synchronization module for separately updating the first set of data files, the second set of executable scripts and the third set of configuration files.

13. A system according to claim 1, wherein the first terminal comprises an electronic device provided with an electronic flight bag software application.

14. A method for determining the performance of an aircraft for at least one flight phase, the method comprising the steps of:
- providing at least one electronic aircraft flight manual for at least one given aircraft type and/or variant, each electronic aircraft flight manual being organized as a first set of data files and a second set of executable scripts, each data file comprising performance lookup tables containing performance values corresponding to the aircraft flight manual, each executable script being associated with at least one data file from the first set of data files and comprising a series of steps for processing at least one data file based on predefined rules;
- providing a third set of configuration files, each identifying the configuration settings of a specific aircraft of the aircraft type and/or variant; providing, on a first terminal, a first user interface arranged for interacting with a first type of user having appropriate qualifications for adapting aircraft settings, the first user interface being arranged for allowing the user to consult and/or set a set of input parameters comprising at least information relating to environmental conditions and information relating to the aircraft type and/or variant and aircraft settings, the set of input parameters being defined based on the selection of a configuration file from the third repository module;
- providing, on a second terminal, a second user interface for accessing at least the configuration settings defined in the configuration files, the second terminal being arranged for interacting with a second type of user having appropriate qualifications for adapting the configuration files or settings;
- providing a calling module which, based on a selection of a configuration file and input parameters received via the first interface, selects at least one executable script file and at least one associated data file for processing by a calculation engine;
- providing the calculation engine, arranged for determining the aircraft performance by processing the selected executable script file and associated data file or files with the input parameters.

15. A method according to claim 14, wherein the first user interface is arranged for receiving an identifier specifying the specific aircraft and a specific flight, which triggers the following steps:
- selecting, in a repository where the data files and executable scripts are stored, a subset of the data files and scripts for the aircraft type and/or variant matching the identified specific aircraft;
- selecting, in a repository where the configuration files are stored, the configuration file relating to the identified specific aircraft;
- defining, on the basis of the selected configuration file, the set of input parameters for the first user interface, which includes collecting information relating to environmental conditions relevant for the identified flight.

* * * * *